United States Patent
Marimuthu

(10) Patent No.: US 9,942,752 B1
(45) Date of Patent: Apr. 10, 2018

(54) METHOD AND SYSTEM FOR DETECTING PHISHING CALLS USING ONE-TIME PASSWORD

(71) Applicant: Symantec Corporation, Mountain View, CA (US)

(72) Inventor: Venkadesan Marimuthu, Tamil Nadu (IN)

(73) Assignee: SYMANTEC CORPORATION, Mountain View, CA (US)

( * ) Notice: Subject to any disclaimer, the term of this patent is extended or adjusted under 35 U.S.C. 154(b) by 0 days.

(21) Appl. No.: 15/395,267

(22) Filed: Dec. 30, 2016

(51) Int. Cl.
| | |
|---|---|
| H04M 1/66 | (2006.01) |
| H04W 12/04 | (2009.01) |
| H04L 29/06 | (2006.01) |
| H04W 12/06 | (2009.01) |
| H04W 4/14 | (2009.01) |
| G06Q 20/40 | (2012.01) |
| G10L 15/26 | (2006.01) |
| G10L 15/22 | (2006.01) |

(52) U.S. Cl.
CPC ........ *H04W 12/04* (2013.01); *G06Q 20/4016* (2013.01); *G10L 15/22* (2013.01); *G10L 15/26* (2013.01); *H04L 63/0838* (2013.01); *H04L 63/1483* (2013.01); *H04W 4/14* (2013.01); *H04W 12/06* (2013.01)

(58) Field of Classification Search
CPC ....... H04W 12/04; H04W 12/06; H04W 4/14; G10L 15/22; G10L 15/26; G06Q 20/4016
See application file for complete search history.

(56) References Cited

U.S. PATENT DOCUMENTS

| | | | |
|---|---|---|---|
| 2007/0079135 A1* | 4/2007 | Saito ................ | G06F 21/35 713/183 |
| 2011/0211682 A1* | 9/2011 | Singh ................ | H04M 1/57 379/142.05 |
| 2012/0303960 A1* | 11/2012 | Wankmueller ....... | H04L 9/3273 713/169 |
| 2016/0285628 A1* | 9/2016 | Carrer .............. | H04L 9/3228 |

* cited by examiner

*Primary Examiner* — Wayne H Cai
(74) *Attorney, Agent, or Firm* — Maschoff Brennan

(57) ABSTRACT

A method for phishing detection, performed by a mobile device, is provided. The method includes receiving a first OTP (one-time password), from a remote caller purporting to be from a trusted organization, into the mobile device. The method includes generating a second OTP, using an OTP generation system provided by the trusted organization, and comparing, in the mobile device, the first OTP and the second OTP, wherein the first OTP matching the second OTP indicates legitimacy of the remote caller, and the first OTP mismatching the second OTP indicates illegitimacy of the remote caller. A mobile device and a computer readable media are also provided.

18 Claims, 6 Drawing Sheets

US 9,942,752 B1

METHOD AND SYSTEM FOR DETECTING PHISHING CALLS USING ONE-TIME PASSWORD

BACKGROUND

Researchers report a staggering number of fraudulent schemes implemented using data communications that possess a variety of characteristics. In particular, a common tactic of scammers is to use a technique called "phishing," where an attempt to obtain money and sensitive information, such as usernames, passwords, and credit card details, can be launched by the scammer. Masquerading as a trustworthy entity, such as a bank, an online payment processor, an IT administrator, or a state/federal agency, the scammer sends some form of an electronic communication (such as email or text) to the victim soliciting sensitive information. There is also a growing trend among fraudulent scammers to make phone calls, pretending to be from a financial institution or governing authority in an attempt to extract finances and sensitive data. Particularly, the phone call may be made to a mobile device, landline, or computer having a voice over Internet Protocol (VoIP) voice and video calling service, such as Skype. Such fraudulent phone calls are called voice phishing, or "vishing". Statistically, scammers tend to have a higher success rate using a phone call as the medium of attack, rather than using email or other text-based phishing.

Sometimes a scammer may call a person, leveraging pieces of correct information, which they have sourced from elsewhere, in an effort to entice a person to release more personally or financially descriptive data. For example, there is an uprising of a sophisticated phone scam targeting of taxpayers and recent immigrants, where the scammer pretends to be a representative of the Internal Revenue Service, which requests an immediate tax payment owed to the government. The caller may use a fake name and IRS badge number along with reciting the last four digits of a victim's social security number. Sometimes the scammer associates the IRS toll-free number with its caller identifier data, such that it appears that the IRS is calling the victim. The victim is told that they must pay the sum promptly through a credit card, pre-loaded debit card, or wire transfer. When the victim refuses, the scammer threatens the victim with police arrest, deportation, or revocation/suspension of a business or driver's license. Another person associated with the scammer, calls the victim posing as staff of the local police or Department of Motor Vehicles (DMV), issuing further threats. It is within this context that the embodiments arise.

SUMMARY

In some embodiments, a method for phishing detection, performed by a mobile device, is provided. The method includes receiving a first OTP (one-time password), from a remote caller purporting to be from a trusted organization, into the mobile device. The method includes generating a second OTP, using an OTP generation system provided by the trusted organization, and comparing, in the mobile device, the first OTP and the second OTP, wherein the first OTP matching the second OTP indicates legitimacy of the remote caller, and the first OTP mismatching the second OTP indicates illegitimacy of the remote caller. A mobile device and a computer readable media are also provided.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A method and system for preventing voice phishing using a communication OTP (one-time password) are presented herein. The method and system are in user protection space and deal with preventing voice phishing. Voice phishing is an emergent crime in which victims are deceived during the course of a phone conversation. Scammers claim to work for a company that is trusted, such as a bank, a merchant, a software vendor or supplier, or a government agency, and pressure the call recipient about giving up personal information or bank card related information. Phone scams and telephone banking fraud are becoming increasingly commonplace.

Existing preventive measures such as a system for tracking phone calls, and adding signatures to calls and voice biometric based caller verification are not 100% effective and suitable only for authenticating end user to organization communication. But there may not yet be any foolproof solution to prevent phishing in other way communication (Organization to End User).

Figure 2:
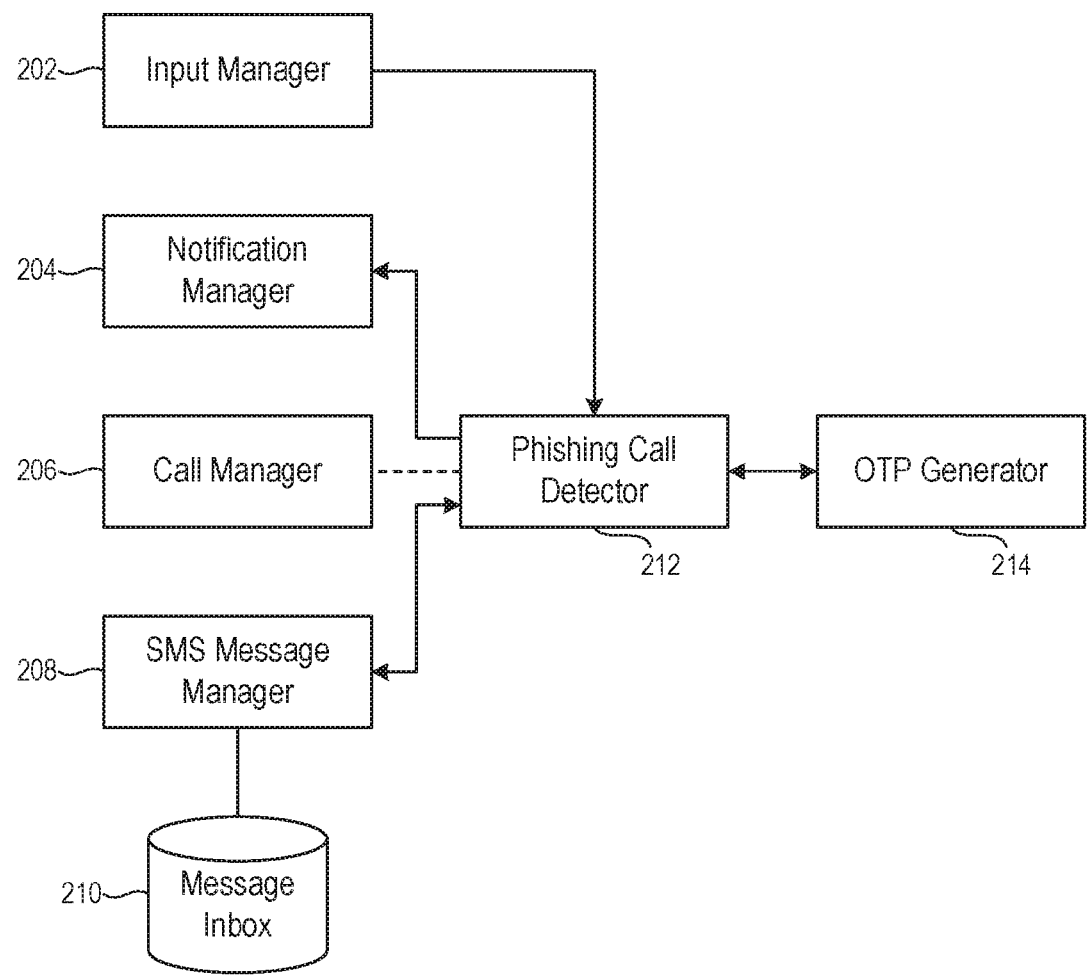
FIG. 2 is a system diagram of a vishing (voice phishing) detection system implemented in the mobile device of FIG. 1.
Figure 3:
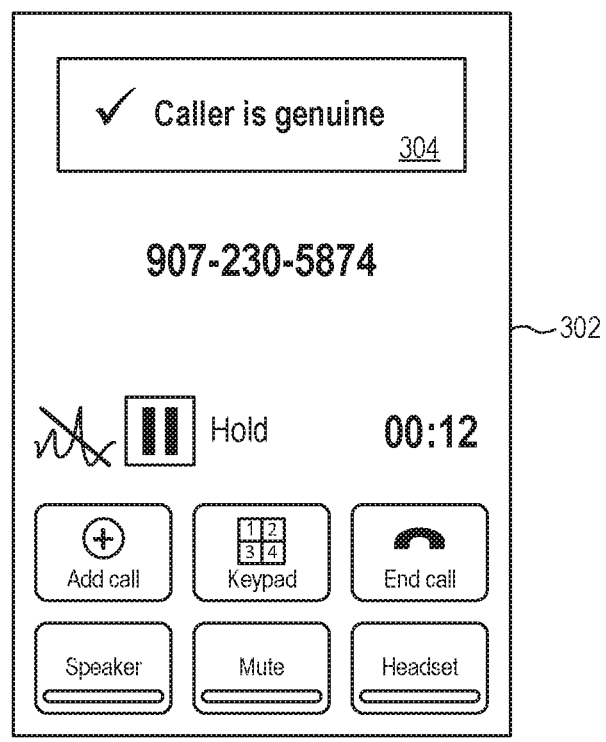
FIG. 3 is an example screenshot of a screen of the mobile device of FIGS. 1 and 2 indicating legitimacy of the call or caller.

The present method and system for detecting phishing phone calls, by means of the remote caller (purportedly representing the trusted organization) of the phone call generating and sending a time based communication OTP corresponding to the recipient (user), the recipient generating (or, re-generating) the OTP locally using the token generation system provided by the trusted organization, and locally comparing the caller supplied OTP with the locally generated OTP embodies a new mechanism. One embodiment is in a mobile device, as shown in FIGS. 1-3 and in the flow diagram of FIG. 4.

Nowadays, organizations such as banks (or corporations) may provide a token generation system to their customers (or employees) for two factor authentication, with one of the factors being by OTP. Currently this mechanism is used only for one-way authentication (End User→Organization), i.e., the organization authenticates the call and therefore the user, by comparing at the organization an OTP sent by the user to an OTP generated by the organization. The proposed mechanism for the user to authenticate a call from a remote caller purporting to be from a trusted organization is to extend this OTP mechanism for authenticating other way communication as well (Organization→End User) in order to identify and avoid voice phishing.

Figure 1A:
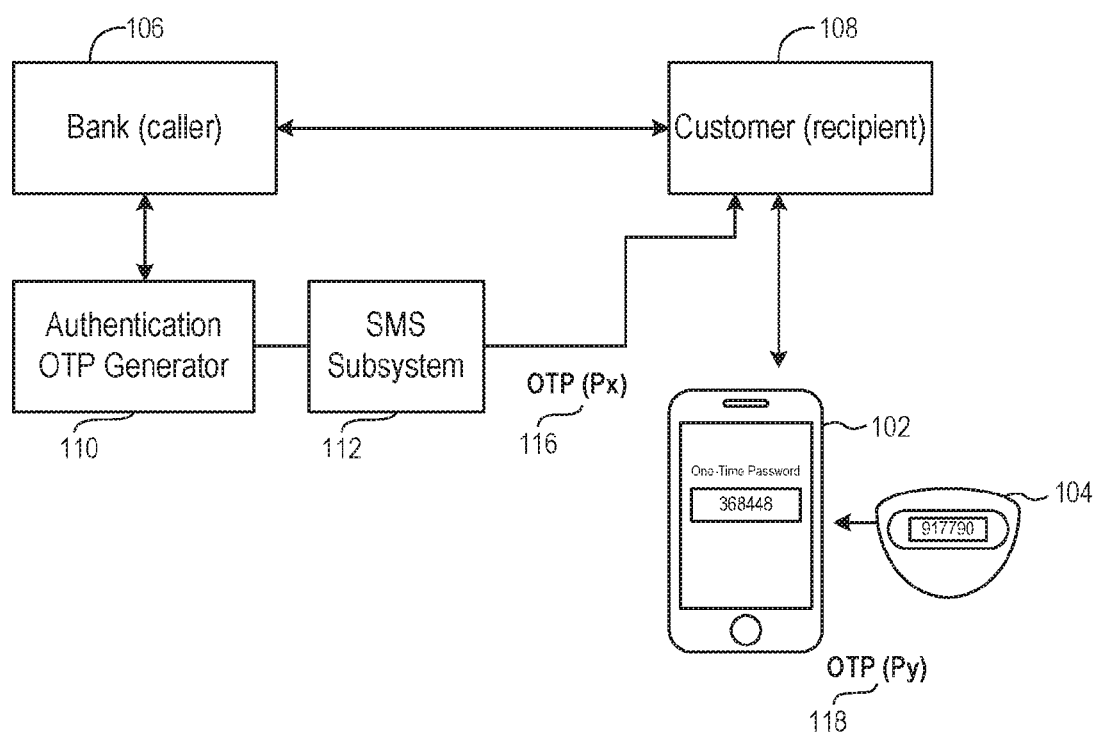
FIG. 1A is a system and scenario diagram, showing a user of a mobile device receiving a call from a remote caller purporting to be from a trusted organization, and the mobile device establishing legitimacy (or illegitimacy) of the call or caller by comparing a remotely generated OTP (one-time password) and a locally generated OTP.

FIG. 1A is a system and scenario diagram, showing a user of a mobile device 102 receiving a call from a remote caller 106 purporting to be from a trusted organization, and the mobile device 102 establishing legitimacy (or illegitimacy) of the call or caller by comparing a remotely generated OTP 116 (one-time password) and a locally generated OTP 118. SMS (short messaging system) capability commonly available in cellular communication and mobile devices is used for transmission of the OTP from the remote caller 106 to the mobile device 102, in this embodiment.

A sample flow for FIG. 1A is presented below.

1. A customer, e.g., call recipient 108, gets a call from a person, e.g., remote caller 106, claiming to be from the bank where the call recipient 108 holds an account.
2. The caller 106 may sound or appear genuine and as a common phone banking confirmation formality, the caller 106 requests some sensitive information from the recipient 108.
3. Before providing any sensitive information, the recipient 108 requests the caller to provide a one-time communication password to authenticate the caller 106.
4. The caller invokes OTP generation system 110 (e.g., at the trusted organization) to generate a time based one-time communication password (i.e., OTP 116 labeled Px) corresponding to that recipient 108.
5. The system sends the generated one-time password (i.e., OTP 116) as an SMS message through the SMS subsystem 112 to the recipient's 108 mobile number (i.e., to the mobile device 102).
6. The recipient 108 receives the SMS message with the remote caller-generated OTP 116 (i.e., Px) and uses the OTP generation system 104 provided by the organization and locally, i.e., in the vicinity of the mobile device 102) regenerates the time based OTP as a locally generated OTP 118 labeled Py.
7. Recipient compares OTP 116 sent by the caller 106 (i.e., Px) with the locally generated OTP 118 (i.e., Py) to check whether the caller 106 is genuine.
8. If a remotely generated OTP 116 is not received or OTP mismatch is found, then recipient 108 can treat this as a phishing call.

Figure 1B:
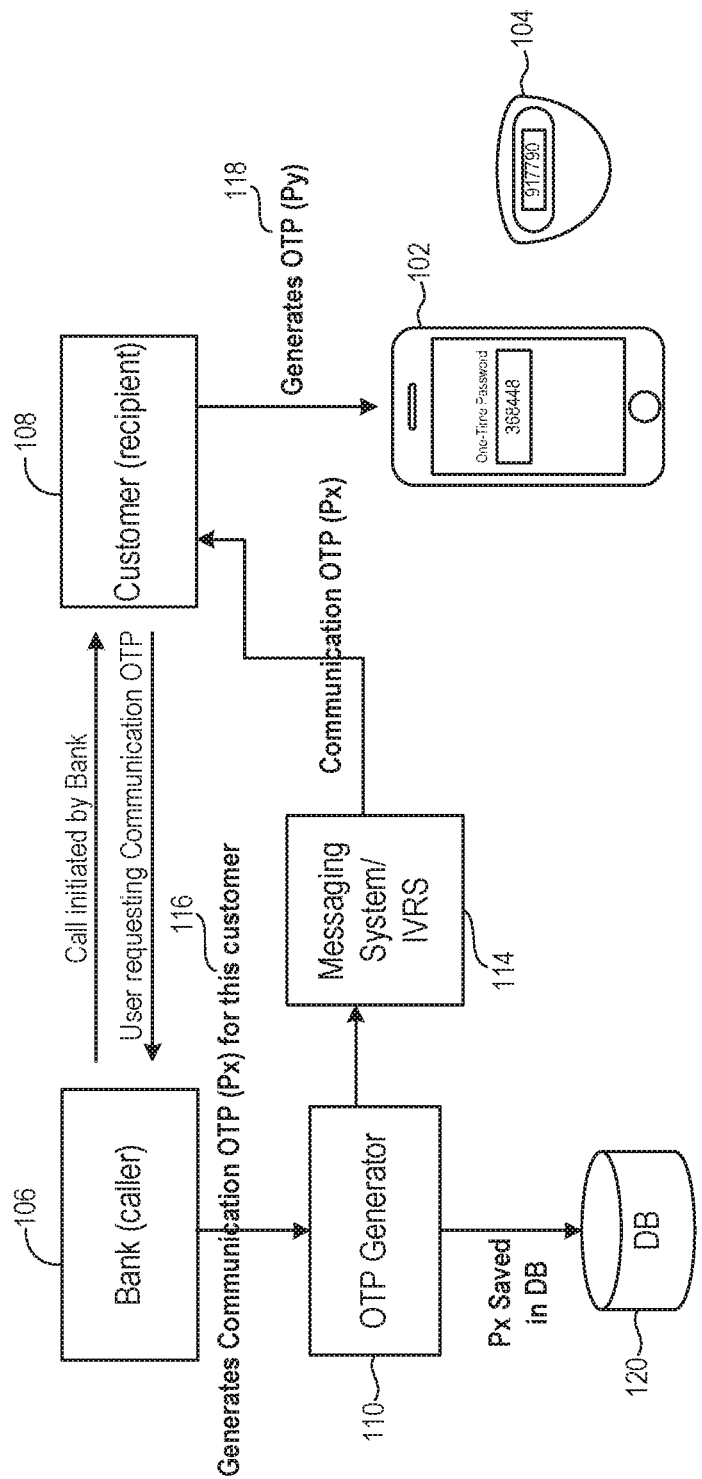
FIG. 1B depicts a variation of the system and scenario in FIG. 1A, using interactive voice response system.

In some embodiments, e.g., as depicted in FIG. 1A and further in FIG. 1B, the locally generated OTP 118 (Py) is produced by an OTP generation system 104 depicted as an electronic communication device distinct from the mobile device 102. The OTP generation system 104 communicates the locally generated OTP 118 (Py) to the mobile device 102 wirelessly, or in some embodiments via a connector or cable, and in further embodiments via user manual entry of the OTP 118 (e.g., as displayed on a screen of the OTP generation system 104) into the mobile device 102. In still further embodiments, the OTP generation system 104 is implemented as an application that is downloadable to the mobile device 102, e.g., from a trusted organization. Or, the OTP generation system 104 could be integrated, e.g., as software, with the remaining components of the voice phishing detection system implemented in the mobile device 102.

FIG. 1B depicts a variation of the system and scenario in FIG. 1A, using interactive voice response system. A sample flow for FIG. 1B is presented below.

1. A customer, e.g., call recipient 108, gets a call from a person, e.g., remote caller 106, claiming to be from the bank where the call recipient 108 holds an account.
2. The caller 106 may sound or appear genuine and as a common phone banking confirmation formality, the caller 106 requests some sensitive information from the recipient 108.
3. Before providing any sensitive information, the recipient 108 requests the caller to provide a one-time communication password to authenticate the caller 106.
4. The caller invokes OTP generation system 110 (e.g., at the trusted organization) to generate a time based one-time communication password (i.e., OTP 116 labeled Px) corresponding to that recipient 108. In some versions, the OTP 116 (Px) is written into a database 120 at the trusted organization.
5. The system sends the generated one-time password as a speech message through a messaging system/IVRS (interactive voice response system, also generally known as speech synthesis/speech recognition) to the recipient's 108 mobile number (i.e., to the mobile device 102). That is, the system uses speech synthesis to communicate the OTP 116. Alternatively, the remote caller 106 speaks the OTP 116 (i.e., uses human voice to communicate the OTP 116).
6. The recipient 108 receives the speech message. The mobile device 102 of the customer 108 uses speech recognition (e.g., a local IVRS in the mobile device 102) to transcribe the spoken message with the remote caller-generated OTP 116 (i.e., Px) to text. The mobile device 102 uses the OTP generation system 104 provided by the organization and locally, i.e., in the vicinity of the mobile device 102) regenerates the time based OTP as a locally generated OTP 118 labeled Py.
7. Recipient compares OTP 116 sent by the caller 106 (i.e., Px) with the locally generated OTP 118 (i.e., Py) to check whether the caller 106 is genuine.
8. If a remotely generated OTP 116 is not received or OTP mismatch is found, then recipient 108 can treat this as a phishing call.

In some embodiments, there are two types of OTPs, a communication OTP and a transaction OTP, distinct from each other. The communication OTP is used by the customer 108 to authenticate the remote caller 106 as described above. And, the transaction OTP is used by the bank or other organization for authenticating transactions with the customer 108. Consider a case where a hacker has stolen or gained access to a customer's mobile device 102 and receives a genuine call from a bank or other legitimate organization. Using this opportunity, the hacker may request an OTP from the bank for authenticating the caller and attempt to reuse that OTP for doing any transaction/privileged operation. That is the reason for having the concept of a communication OTP which cannot be used for transaction purposes. To accommodate this new OTP, existing 2FA (two factor authentication) should be enhanced. It should be appreciated that customers/client side token systems need not have this enhancement and may continue generating OTP which is suitable for phishing call detection or for doing privileged operations/transactions in some embodiments.

FIG. 2 is a system diagram of a vishing (voice phishing) detection system implemented in the mobile device of FIG. 1. The mobile device 102 has memory and a processor, and is configurable through software in the memory to perform various processes. Alternatively, hardware, firmware, or various combinations of hardware, firmware and/or software could be used for these processes. A voice phishing call detector app (i.e., software application) running in a customer's mobile device 102 detects incoming calls by listening to appropriate events from Call/Telephony Manager service, call manager 206. The mobile device 102 invokes appropriate APIs (application programming interfaces) in Notification/View Manager service, notification manager 204, to display a notification message and to provide an option to initiate phishing detection process. The customer (recipient 108) requests the caller 106 to send a communication OTP and triggers the phishing detection process.

Once the voice phishing detection process is initiated, the phishing call detector 212 system listens for an incoming OTP message, through the SMS message manager 208 and the message inbox 210, and parses the incoming message to retrieve the communication OTP 116 code (Px). The mobile device 102 also invokes an OTP generator 104 installed in the mobile device, to generate the OTP 118 code (Py). In some embodiments, the OTP generator/notification manager 204 performs a process of API TokenSystem.getOTP (curTime) to generate time based OTP (Py) based on current time, which is synchronized with the trusted organization. In some embodiments, the OTP generator 204 uses a shared secret key that is either exchanged with the trusted organization, or generated in the mobile device 102 and similarly generated by the trusted organization. The shared secret key and/or time synchronization is used as a basis for both the remotely generated OTP 116 and the locally generated OTP 118. With either, or both of these factors in play, a hacker is unable to generate an OTP 116 remotely that will match the locally generated OTP 118. Other methods and mechanisms for coordinating remotely generated OTP 116 and locally generated OTP 118 with a trusted organization, which coordination would be unavailable to a hacker, are readily devised in keeping with the teachings herein.

The phishing call detector 212 compares OTP 116 (Px) and OTP 118 (Py) to confirm whether the call is genuine and display a new notification UI (user interface) indicating whether the call is genuine or a phishing call.

Example algorithms are presented below.

A first algorithm uses a time counter with intervals that are prearranged to coordinate with a time counter at the trusted organization, and a secret key that is previously arranged to share with the trusted organization.

Time based OTP (TOTP)=HOTP(secretkey, TC) mod 10 pow d (i.e., modulo 10 to the power of the number of digits) where HOTP is HMAC (hash-based message authentication code) based OTP
TC is Time counter based on current time
d is the desired number of digits
secretkey is specific to the customer and same value used in Bank's OTP generator and the customer's OTP generator.
TOTP generated by Bank for authentication=Px
TOTP generated by Customer for authentication=Py
If (Px==Py) then the caller is genuine; else the caller to be treated as phisher A second algorithm uses a customer ID (identifier) and current time to generate a communication OTP.
Function GenerateCommunicationOTP(curTime, customerId) //CALLER SIDE//Algorithm for generation and transmission of communication OTP
BEGIN
secretKey=DB.getSecretKey(customerId); //Retrieve secret key for this customer communicationOTP=TOTP_VAL (curTime, secretKey) //TOTP_VAL is Time based OTP (as defined in standard RFC 6238 in one embodiment)
DB.saveCommunicationOTP(customerId, communicationOTP); //OTP not for transaction purpose
MessageSystem.send(DB.getContact(customerId), comm_otp, "additional security instructions");
END A third algorithm uses a customer supplied OTP to perform two factor authentication.
Function performTwoFactorAuthentication(customerId, customerSuppliedOTP) //CALLER SIDE
//Enhanced 2FA algorithm which includes communication OTP validation
BEGIN
communicationOTP=DB.getCommOTP(customerId);
if (customerSuppliedOTP==communicationOTP)
{
return ERROR_NON_TRANSACTION_OTP; //customer supplied communication OTP
}
secretKey=DB.getSecretKey(customerId); //Retrieve secret key for this customer expectedOTP=TOTP_VAL(curTime, secretKey) //TOTP_VAL is Time based OTP-RFC 6238
if(customerSuppliedOTP !=expectedOTP)
{
return ERROR_INCORRECT_OTP;
}
return SUCCESS;
END A fourth algorithm compares a caller supplied OTP to an expected OTP.
Function detectPhishingCall(callerSuppliedOTP) //RECIPIENT SIDE //Algorithm to validate communication OTP and detect phishing calls BEGIN
expectedOTP=TokenSystem.getOTP(curTime);
if (callerSuppliedOTP !=expectedOTP)
{
return ERROR_PHISHING_CALL;
}
return SUCCESS;
END FIG. 3 is an example screenshot of a screen 302 of the mobile device 102 of FIGS. 1 and 2 indicating legitimacy of the call or caller. In this example, the message 304 displayed on the display screen 302 of the mobile device says, "Caller is genuine". Various messages, displays or other indications by the mobile device are readily devised in keeping with the teachings herein. In some versions, there is an audio message, using recorded or synthesized speech.

With reference to FIGS. 1-3, an embodiment of a system design is described below. Phishing call detector 212 component, running in the mobile device, receives an event from the call manager 206 for the incoming call. While the call is in progress, Phishing call Detector 212 displays a popup UI on the screen 302 of the mobile device 102 to enable a phishing detection process by invoking the notification manager 204 existing in the device.

When the user clicks to confirm phishing detection, the input manager 202 sends a callback to the phishing detection system with the user option. Phishing call detector 212 listens for the incoming OTP message and when the message is received, parses the message and retrieves the OTP 116 code (Px). The phishing call detector 212 also invokes the generate_otp(current_timestamp) API in the OTP Generator 214 installed in the mobile device to generate time based OTP 118 (Py).

The phishing call detector 212 compares OTP 116 Px with OTP 118 Py to confirm whether the call is genuine and popups a new notification UI on the screen 302 of the mobile device 102 denoting whether the call is genuine or a phishing call.

Figure 4:
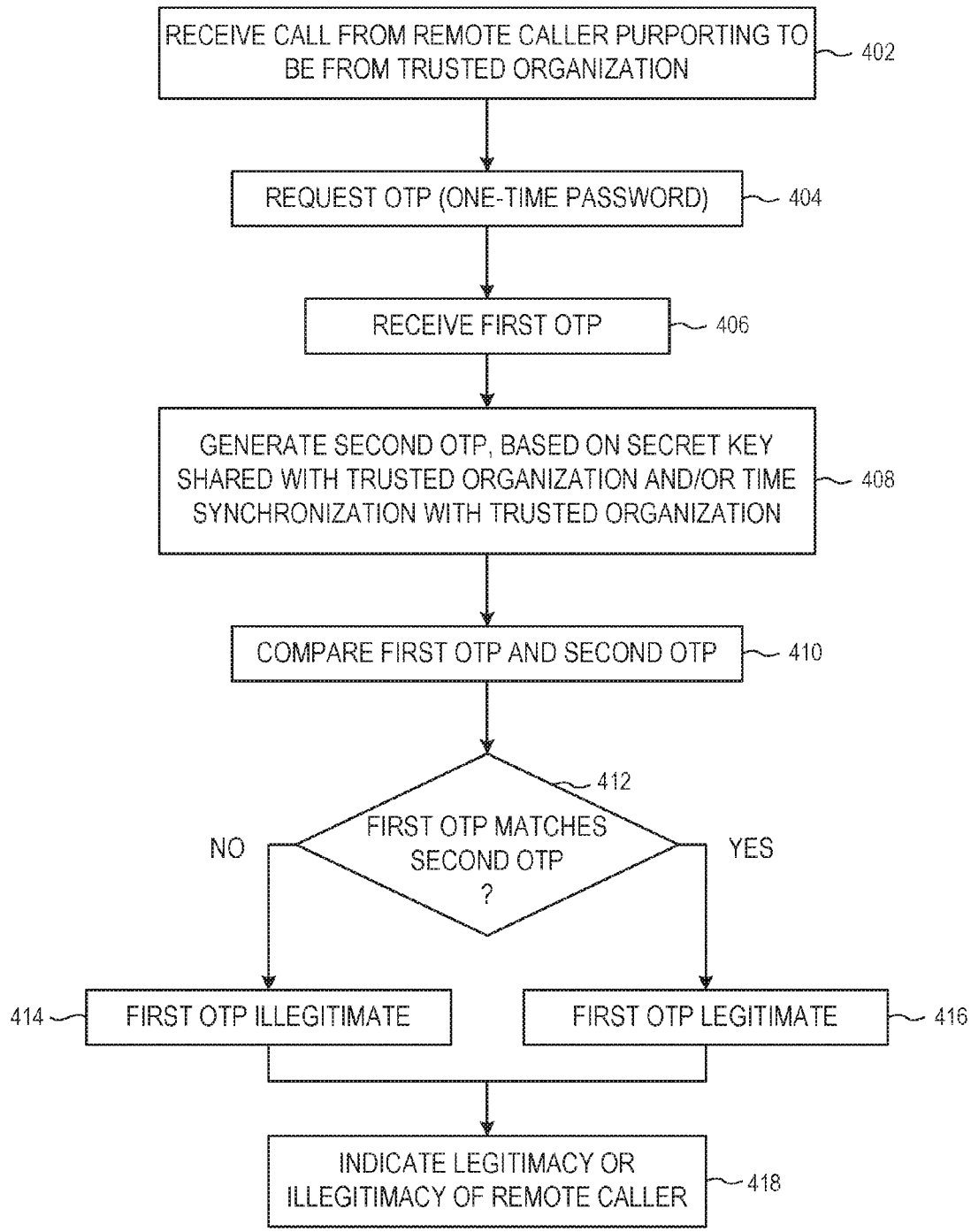
FIG. 4 is a flow diagram of a method for voice phishing detection, which can be performed on or by the mobile device of FIGS. 1-3.

FIG. 4 is a flow diagram of a method for voice phishing detection, which can be performed on or by the mobile device of FIGS. 1-3. The method can be performed by one or more processors of the mobile device in cooperation with hardware, firmware, software executing on a processor, or various combinations thereof, of the mobile device.

In an action 402, a call is received by the mobile device. The call is received from a remote caller, purporting to be from a trusted organization. This assertion by the remote caller may or may not be true, and the recipient of the call (e.g., owner of the mobile device) would like to verify legitimacy of the remote caller. The recipient of the call requests a one-time password (OTP), in an action 404. That is, the recipient of the call requests that the remote caller send a remotely generated OTP to the mobile device.

In an action 406, the mobile device receives the first OTP, which is the remotely generated OTP sent by the remote caller. In an action 408, the mobile device generates the second OTP. This could be done by an OTP generation system internal to the mobile device. Alternatively, an external OTP generation system generates the local OTP and communicates the local OTP to the mobile device, or the recipient of the call manually enters the local OTP from the external OTP generation system into the mobile device, as the second OTP.

In an action 410, the mobile device compares the first OTP and the second OTP. In the determination action 412, it is determined whether the first OTP matches the second OTP. If the first OTP does not match the second OTP, the mobile device determines, in the action 414, that the first OTP is illegitimate. If the first OTP does match the second OTP, the mobile device determines, in the action 416, that the first OTP is legitimate. In either case, in the action 418, the mobile device indicates legitimacy or illegitimacy of the remote caller, based on the determination. This indication could be in the form of a message displayed on a screen of the mobile device, or an audio message, or both. Various further indications are readily devised, such as a notification by email, automatic termination of the call, logging of the caller ID along with a flag, etc.

With further reference to FIGS. 1-4, various system aspects and further embodiments for preventing voice phishing are discussed below. Consider a case where a hacker is spoofing customer's mobile number and impersonating the customer to get the OTP password. Since the generated OTP is sent only to the registered customer's mobile number in the form of SMS message, the hacker will not directly get this OTP password without gaining access to the customer's mobile device.

Even the automated calls from a bank or other organization may inform the user and send a customer specific communication OTP to assure that the call is genuine and not a phishing scam.

Various embodiments for preventing voice phishing can be used for other modes of communication (SMS, Email, Live Chat) by embedding this communication OTP with the message and the recipient generating a communication OTP for the message sent time and comparing it with the OTP sent by the sender. To implement this, existing token systems (organization as well as client side) could be enhanced to generate the OTP based on message sent time.

Client side token systems can also be enhanced to have a new option to generate the communication OTP apart from the normal OTP used for transaction purposes. But this is not necessary for some embodiments. A token generation system can be enhanced to generate a non-transaction OTP password (i.e., the communication OTP) used only for phishing detection/caller authentication purpose. The token generation system (hardware/soft token) for some embodiments should have two secret keys, one key for the transaction OTP password and the other key for the caller authentication OTP password (i.e., the communication OTP).

In some embodiments, the communication OTP is sent as an SMS message, and in other embodiments, instead of sending the communication OTP as an SMS message, it is possible to speak-out the communication OTP to the recipient via an IVRS system.

Some embodiments use time synchronization with a trusted organization, for generation of both the remote OTP (i.e., remote from the mobile device) and the local OTP (i.e., local to the mobile device). With time synchronization, an OTP intercepted by a hacker cannot be reused at a later time, as the OTP will have expired with the passage of the synchronized time interval. Embodiments without time synchronization do not have this advantage, but can still rely on a secret, shared key or other coordination with the trusted organization(s) to deny the hacker the capability of producing a valid OTP. Some embodiments use a customer or other personal ID for generation of both the remote OTP and the local OTP. Personalizing the OTP to an individual in this manner prevents a hacker from reusing an intercepted OTP for further victims. Still further embodiments could use other types of OTP generation, such as a secret, shared sequence arranged with the trusted organization, hardcopy lists of passwords, hash chains, challenges, etc., or out of band transmission.

Various embodiments have the following advantages. Very high effectiveness in detecting phishing calls. Existing OTP generation system(s) can be used, hence no other costly system(s) or infrastructure is needed. Embodiments can be integrated with or implemented as add-ons to mobile security products and token generation products, or implemented as standalone applications for mobile devices. Since phishing calls are major attack vectors for several other serious threats, detection and prevention of voice phishing is a worthwhile goal and result of the present method and system.

Figure 5:
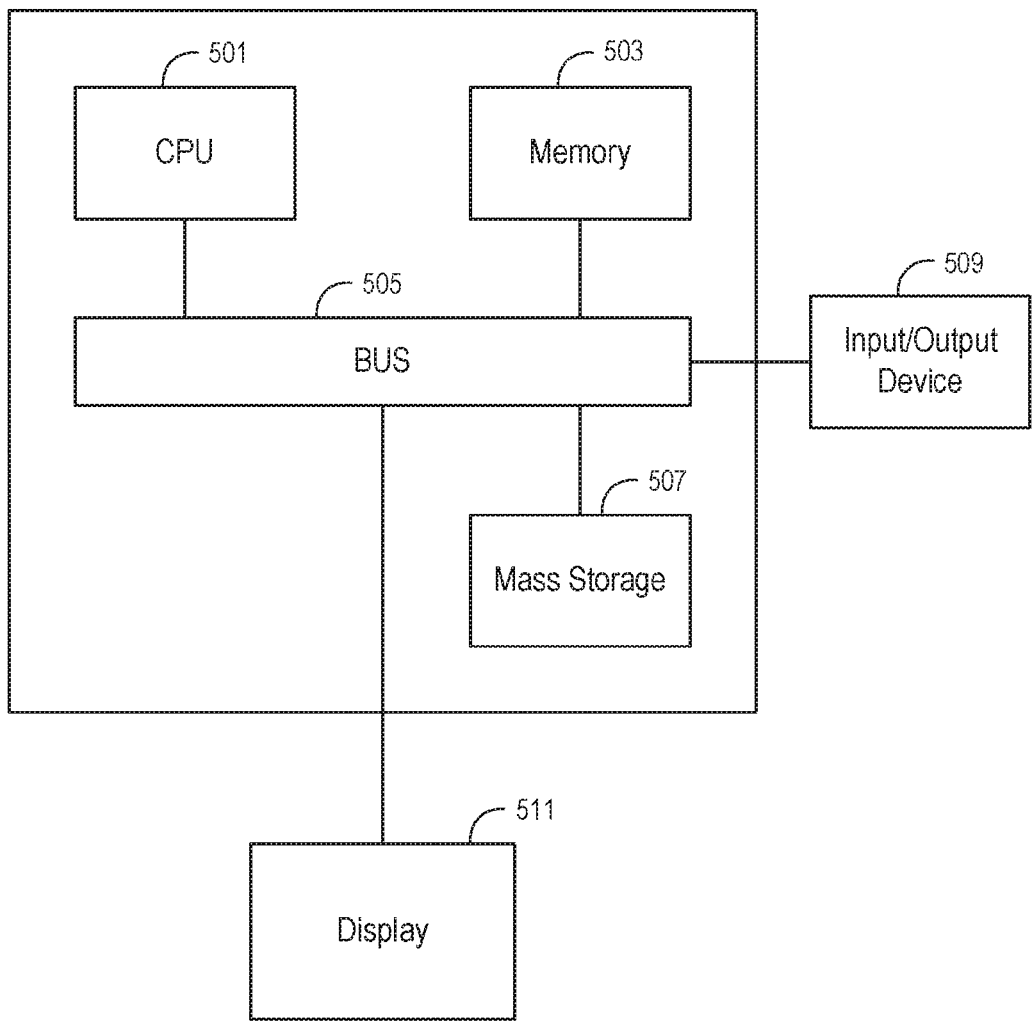
FIG. 5 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for preventing voice phishing by using a one-time password in accordance with some embodiments. The computing device includes a central processing unit (CPU) 501, which is coupled through a bus 505 to a memory 503, and mass storage device 507. Mass storage device 507 represents a persistent data storage device such as a floppy disc drive or a fixed disc drive, which may be local or remote in some embodiments. The mass storage device 507 could implement a backup storage, in some embodiments. Memory 503 may include read only memory, random access memory, etc. Applications resident on the computing device may be stored on or accessed via a computer readable medium such as memory 503 or mass storage device 507 in some embodiments. Applications may also be in the form of modulated electronic signals modulated accessed via a network modem or other network interface of the computing device. It should be appreciated that CPU 501 may be embodied in a general-purpose processor, a special purpose processor, or a specially programmed logic device in some embodiments.

Display 511 is in communication with CPU 501, memory 503, and mass storage device 507, through bus 505. Display 511 is configured to display any visualization tools or reports associated with the system described herein. Input/output device 509 is coupled to bus 505 in order to communicate information in command selections to CPU 501. It should be appreciated that data to and from external devices may be communicated through the input/output device 509. CPU 501 can be defined to execute the functionality described herein to enable the functionality described with reference to FIGS. 1-4. The code embodying this functionality may be stored within memory 503 or mass storage device 507 for execution by a processor such as CPU 501 in some embodiments. The operating system on the computing device may be MS DOS™, MS-WINDOWS™, OS/2™, UNIX™, LINUX™, or other known operating systems. It should be appreciated that the embodiments described herein may also be integrated with a virtualized computing system that is implemented with physical computing resources.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for phishing detection, performed by a mobile device, comprising:
   receiving a first communication OTP (one-time password), from a remote caller purporting to be from a trusted organization, into the mobile device, the first communication OTP being distinct from a transaction OTP used for financial transactions;
   generating a second communication OTP, using an OTP generation system provided by the trusted organization, the second communication OTP being distinct from a transaction OTP used for financial transactions;
   comparing, in the mobile device, the first communication OTP and the second communication OTP; and
   in response to the first communication OTP matching the second communication OTP, determining that the remote caller is legitimate; or
   in response to the first communication OTP mismatching the second communication OTP, determining that the remote caller is illegitimate.

2. The method of claim 1, further comprising:
   indicating, by the mobile device, the legitimacy or illegitimacy of the remote caller, based on the comparing.

3. The method of claim 1, wherein the receiving of the first communication OTP comprises:
   receiving the first communication OTP as an SMS (short messaging service) message.

4. The method of claim 1, wherein the receiving of the first communication OTP comprises:
   receiving the first communication OTP as a speech message; and
   transcribing, using voice recognition in the mobile device, the speech message to text.

5. The method of claim 1, wherein:
   each of the trusted organization and the mobile device has a secret key specific to a user of the mobile device; and
   each of the first communication OTP and the second communication OTP is based on the secret key.

6. The method of claim 1, wherein the generating of the second communication OTP comprises:
   generating a time-based OTP that is based on time-synchronization with the trusted organization.

7. A tangible, non-transitory, computer-readable media having instructions thereupon which, when executed by a processor of a mobile device, cause the processor to perform a method comprising:
   receiving a first communication OTP (one-time password) into the mobile device, the first communication OTP being from a remote caller purporting to be from a trusted organization, the first communication OTP being distinct from a transaction OTP used for financial transactions;
   producing a second communication OTP, from within the mobile device or received from an OTP generation system external to the mobile device, the second communication OTP being distinct from a transaction OTP used for financial transactions;
   comparing the first communication OTP and the second communication OTP, in the mobile device; and
   in response to the first communication OTP and the second communication OTP matching determining that the remote caller is legitimate; or
   in response to the first communication OTP and the second communication OTP mismatching, determining that the remote caller is illegitimate.

8. The computer-readable media of claim 7, wherein the method further comprises:
   displaying, on a screen of the mobile device, an indication of the legitimacy or illegitimacy of the remote caller, based on the comparing.

9. The computer-readable media of claim 7, wherein the receiving of the first communication OTP comprises receiving the first communication OTP in an SMS (short messaging service) message.

10. The computer-readable media of claim 7, wherein the receiving of the first communication OTP comprises:
    receiving the first communication OTP by human voice or synthesized voice; and transcribing the first communication OTP from the human voice or the synthesized voice into text, using speech recognition in the mobile device.

11. The computer-readable media of claim 7, wherein the method further comprises:
generating or exchanging a secret key specific to a user of the mobile device such that the trusted organization and the mobile device share the secret key.

12. The computer-readable media of claim 7, wherein:
the producing the second communication OTP is based on time-synchronization with the trusted organization.

13. A mobile device with a vishing (voice phishing) detection system, comprising:
a mobile device having memory and a processor; and
the mobile device configurable to perform a method comprising:
receiving a first communication OTP (one-time password), from a remote caller represented as from a trusted organization, into the mobile device, the first communication OTP being distinct from a transaction OTP used for financial transactions;
generating a second communication OTP within the mobile device or receiving the second communication OTP from a device external to the mobile device, the second communication OTP being distinct from a transaction OTP used for financial transactions;
comparing the first communication OTP and the second communication OTP, in the mobile device; and
indicating legitimacy or illegitimacy of the remote caller, based on the comparing.

14. The mobile device of claim 13, wherein the mobile device is configurable to receive the first communication OTP in an SMS (short messaging service) message.

15. The mobile device of claim 13, wherein:
the mobile device is configurable to receive the first communication OTP as a speech message by human voice or speech synthesis; and
the mobile device is configurable to transcribe the first communication OTP from the speech message to text.

16. The mobile device of claim 13, wherein the mobile device is configurable to generate or exchange a secret key specific to a user of the mobile device so that the trusted organization and the mobile device share the secret key and base the first communication OTP and the second communication OTP on the secret key.

17. The mobile device of claim 13, wherein:
the mobile device is configurable to generate a transaction OTP for financial transactions; and
the transaction OTP is distinct from the first communication OTP and the second communication OTP.

18. The mobile device of claim 13, wherein the mobile device is configurable to generate the second communication OTP using time-synchronization with the trusted organization.

* * * * *